O. KRENKE.
CREAM SEPARATOR.
APPLICATION FILED SEPT. 23, 1921.

1,426,880. Patented Aug. 22, 1922.

Witness
R. H. Olsen

Inventor
Otto Krenke
By Harry Irwin Cromer
Atty.

UNITED STATES PATENT OFFICE.

OTTO KRENKE, OF PORT HURON, MICHIGAN, ASSIGNOR TO EARNEST L. POWERS, OF PORT HURON, MICHIGAN.

CREAM SEPARATOR.

1,426,880.     Specification of Letters Patent.     Patented Aug. 22, 1922.

Application filed September 23, 1921. Serial No. 502,779.

*To all whom it may concern:*

Be it known that I, OTTO KRENKE, a citizen of the United States, residing in Port Huron, in the county of St. Clair and State of Michigan, have invented certain new and useful Improvements in Cream Separators, of which the following is a specification.

This invention relates to that class of cream separators, or centrifugal machines having a rotary bowl provided with separator disks or similar or equivalent elements on the inside of the bowl, and having suitable inlet and outlet openings, and means for rotating the bowl, for separating cream or butter fat from milk, or the relatively light from the heavier particles or portions of material to be operated upon.

The principal object of the invention is to provide a simple, economical and efficient cream separator or centrifugal separating machine.

A further object of the invention is to provide a self-balancing bowl which is adapted to be automatically balanced by the automatic adjustment or movement of the superposed disks with relation to each other and with respect to the bowl shell to balanced position, and which is so constructed as to enable the separated cream on the inside of the bowl to reach and be discharged through the cream outlet without being disturbed and agitated by and intermixed with either the separated milk or the incoming or whole milk passing into or being operated upon within the bowl.

Other and further objects of the invention will appear from the following description and claims, and from an inspection of the accompanying drawings, which are made a part hereof.

The invention consists in the features, combinations of elements, details of construction and arrangement of parts herein described and claimed.

In the accompanying drawings:—

Figure 1:
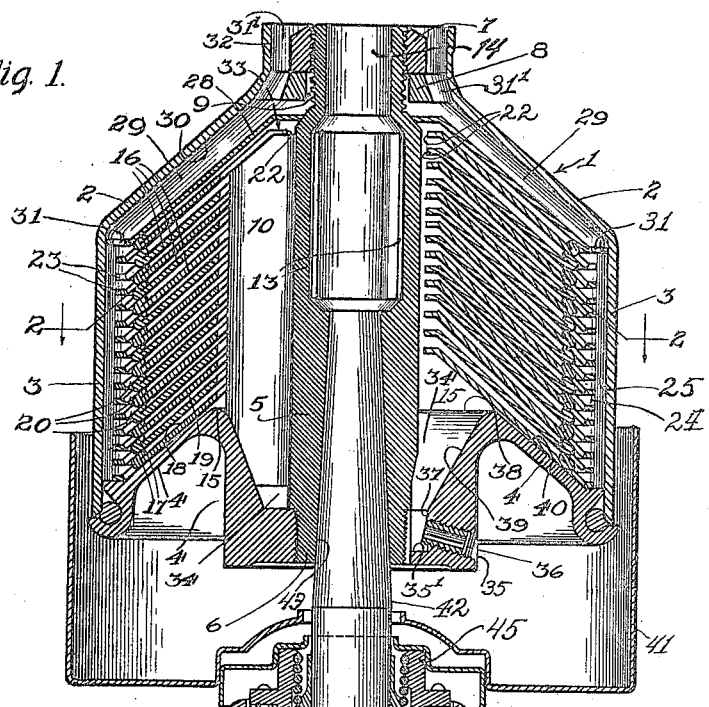
Figure 1 is a view in central transverse vertical section, taken through the axial center of a bowl constructed in accordance with my invention.
Figure 3:
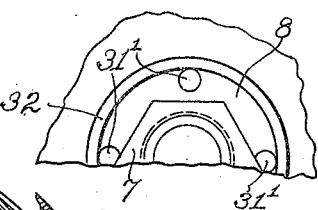
Fig. 3 is a top plan view of the bowl, showing the milk outlets, but with parts broken away.
Figure 2:
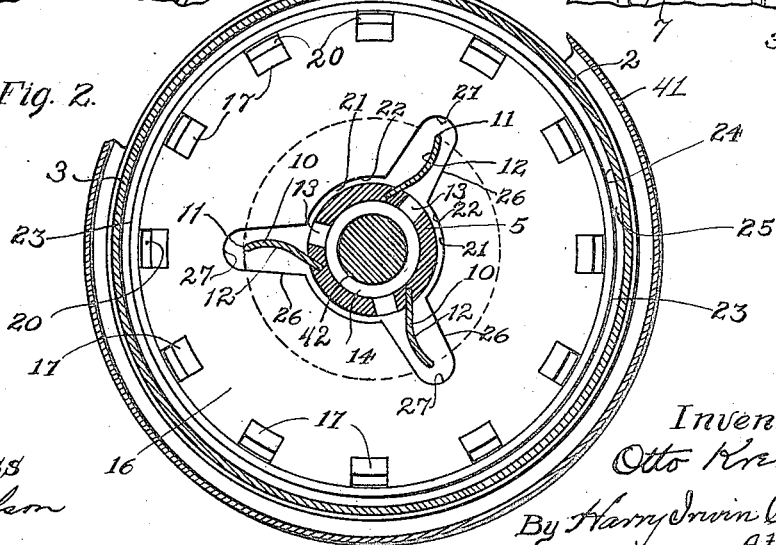
Fig. 2 is a view in section taken on line 2—2 of Fig. 1, looking in the direction indicated by the arrows.

In constructing a cream separator or centrifugal separating machine in accordance with my invention, I provide a bowl 1 which comprises in its construction a hollow bowl shell 2 having cylindrical upright side walls 3, a base 4, a central axial hollow shaft 5 the lower end of which is fixed to the base by means of screw threads 6 connecting the hollow shaft and base in threaded engagement with each other, or by any desired ordinary or suitable securing means, and the upper end of the hollow shaft being secured in fixed detachable relation to the upper bowl shell member or top of the bowl shell by means of a nut 7 in threaded engagement with the hollow shaft and located on the outside of and in engagement with the bowl shell head 8 which has an axial opening 9 therein through which the upper end of the hollow shaft extends, or to which said shaft is secured in the manner described, or by any ordinary or suitable securing means.

Fixed to the periphery of the hollow shaft 5, and extending upwardly and downwardly longitudinally thereof and projecting radially from the peripheral face of said shaft are a plurality or series of radial accelerator blades 10, which are spaced apart uniformly around or circumferentially of the shaft. These accelerator blades are, by preference, curved outward and rearward in the direction of the outer margins or edges 11, or outward and rearward with respect to the direction of rotation of the blades and bowl when in operation. The rear sides 12 of the blades are thus concave, and adapted to admit and form a conduit for separated cream within the cream zone directly back of the rear concave faces of the blades and between the blades; and the hollow shaft is provided with a plurality of peripheral whole milk inlet openings 13. each of which is between a pair of adjacent spaced-apart blades 10, and communicates with the upright axial opening 14 in the hollow shaft, and in position to receive and permit the flow of milk admitted into the axial opening 14 in the hollow shaft, and discharge such milk into the interior of the separator chamber 15 formed by the bowl, and which encircles or surrounds the hollow shaft, and contains a multiplicity or series of dished or truncated-cone shaped separator disks or plates 16 which are located on the inside of the bowl shell and separator chamber in spaced-apart superposed relation to each other, with space ing lugs 17 formed on and located between the convex side or face 18 of each disk and the concave side 19 of the next adjacent disk, respectively, throughout the entire series of superposed disks. These spacing lugs may be formed by punching and bending each lug back against the face of the disk of which it may form an integral part, thus providing an opening 20 adjacent to each lug and through the peripheral marginal portion of the disk of which such lugs each form an integral part. The openings 20 are adapted to permit the passage of milk therethrough, or through the disks thus spaced apart in superposed relation on the inside of the bowl 2.

Each of the superposed relatively adjustable or movable spaced-apart separator disks 16 is provided with a central or axial opening through which the hollow shaft 5 extends throughout the entire series of said disks. These axial openings 21 in the disks are each somewhat larger in diameter than the hollow shaft, or that portion of the hollow shaft surrounded by such disks, the diameter of each opening 21, and inner circular edge or perimeter 22 which forms the boundary or marginal wall of such opening being sufficiently in excess of the diameter of the hollow shaft or peripheral portion of the hollow shaft encircled by such inner perimeter or inner circular edge of such disk, to permit the movement of each of such disks laterally or transversely with respect to the hollow shaft and with respect to each other to balanced or disk and bowl-balancing position with the inner edges or perimeters of the disks in contact and engagement with the periphery of the hollow shaft, and with the outer edges or peripheries 23 of each and all of the series of superposed separator disks out of contact with the inner face 24 of the peripheral or outer side wall of the bowl or bowl shell. An annular peripheral or circumferential space 25 is thus provided between the peripheries 23 of the disks, and the inner surface of the wall or periphery of the bowl shell, at all times, even when the inner edges or perimeters 22 of the disks are in contact and operative engagement with the periphery of the hollow shaft encircled by said disks. This annular space 25 formed between the peripheries of the disks and the adjacent inner surface or inner periphery 24 of the bowl shell forms an unobstructed annular space 25 aforesaid, which is adapted to at all times permit the passage of milk or liquid between the peripheral edges of the disks and the wall of the bowl shell, even when the disks are in balanced or bowl-balancing position and with any or all of said disks in contact with the hollow shaft. Each of the disks 16 has radial notches 26 extending from the inner edge or perimeter 22 outward radially toward the periphery of the disk and communicating with the inner axial opening 21 of such disk. The upright accelerator blades 10 extend vertically through these notches 26 and through the entire series of superposed separator disks; and the outer ends or radial extremities 27 of these radial notches are each and all a greater distance from the axial center of the hollow shaft or bowl than are any of the outer edges 11 of the blades 10. The outer extremities 27 of the notches 26 are also much wider than the outer adjacent edges of the blades 10, and are at all times out of contact with and in freely movable relation to the upright outer edges of said blades at all points between the said edges of the blades 10 and the peripheries of the disks. The inner edges of the disks 16 are thus permitted to come into contact with the periphery of the hollow shaft while the radial extremity 27 of each notch 26 is out of contact with the adjacent edge of the corresponding radial blade 10, and while the peripheral edges of each and all of the superposed separator disks are out of contact with and spaced apart with respect to the inner surface of the peripheral wall of the bowl shell, and while the bowl shell and disks are in bowl-balancing position.

A top fixed plate or liner plate 28 is mounted in fixed relation to the bowl shell in position to extend between the top one of the series of relatively adjustable separator disks 16, in position to provide a space 29 between said liner plate and the inner surface 30 of the top wall of the bowl shell. The space or passage 29 leads from or communicates with the peripheral marginal portion of the separator chamber 15 below said liner plate which is provided with milk outlet openings 31 therethrough or in the outer peripheral margin thereof adapted to permit the passage of skim-milk from the periphery of the separator chamber or disk-containing chamber upward and inward between the liner plate 28 and the top wall of the bowl shell, through passage 29, and out through skim-milk outlet passages $31^1$ in the top of the bowl shell and over the rim of the flange 32 into the milk receptacle or skim-milk cover, not shown. There is sufficient space 33 between the top liner plate 28 and the top disk 16—normally—to permit the disks 16 to move or adjust themselves relatively to each other to bowl-balancing position, and so that the series of separator disks 16 form a flexible column, and are adapted to rotate with the bowl shell, but with their peripheries at all times out of contact with the outer peripheral wall of the bowl shell.

The bowl is provided with an annular cream-containing and cream-discharge chamber and passage 34 which surrounds the lower portion of the hollow shaft and communicates with the cream outlet or discharge opening or passage 35 in which is mounted a cream screw 36, or other suitable means for controlling and regulating the discharge of cream from the separator chamber, and for regulating and controlling the thickness or richness of the cream as it is discharged from the chamber.

This annular cream chamber and cream discharge passage 34 is of less diameter than the disk-containing portion of the separator chamber, or separator chamber proper 15, and is located below the separator disks 16, and extends upward from the extreme bottom inner portion 35 of the bowl and outward from a relatively small annular bottom cream chamber or annular cream chamber wall portion 37 in the direction of the bottom concave side of the bottom separator disk of the series of disks 16, to an annular cream-chamber rim or marginal lip 38, which is formed, by preference, by the bottom or base of the bowl shell. The annular wall 39 of the cream chamber 34 is, by preference conical or flaring, and extends upward and outward at an incline from the annular bottom of said cream chamber to the top annular rim 38 thereof which encircles the hollow shaft 5 and is located above the level of the bottom outer periphery of the bottom or lower separator disks 16 and below the level of the top or inner perimeter or edge of the lowermost one of said series of disks 16, and between the hollow shaft and the peripheral wall of the bowl shell, forming a tapered or conical annular cream chamber the annular walls of which extend downward and inward around the hollow shaft, and from the annular top rim 38 of said tapered cream-containing chamber or bottom cream chamber portion of the separator chamber to the extreme bottom of the chamber formed by the bowl bottom or base. The top annular rim 38 of this conical or lower annular cream-containing chamber portion 34 of the separator chamber is at or near the outer annular margin of the cream zone, or cream-containing portion of the separator chamber, when in operation, and the accelerator blades 10 extend downward into and radially across said chamber portion 34, so that the cream contained therein and which has been separated from the milk will move with the rapidly rotating bowl shell, but remain separated from the incoming whole milk entering the bowl through the axial milk-inlet passage 14 and radial inlet openings 13 in the hollow shaft, and from the separated milk within the rapidly rotating bowl, and the separator chamber formed thereby.

The bottom cream-containing and cream-discharging chamber 34 and its preferably upwardly and outwardly inclined conical wall 39 and top rim or margin 38 are located below the level of the bottom extremities of all of the milk inlet openings, and encircle the hollow shaft below said openings and below the level of the inner edge or perimeter of the lowermost one of the series of superposed separator disks or plates 16; and the inner relatively small annular bottom wall portion 37 of the tapered or conical shaft-encircling bottom cream chamber thus formed should be, and in the form of the device shown in the drawings, is inside of or nearer the axial center of the separator chamber than the inner extremities of any of the milk-discharging openings $31^1$, which are, by preference, at the opposite end or extremity of the bowl. The wall 39 of the conical annular cream chamber 34, and the annular top rim 38 of said conical cream chamber portion of the separator chamber 15 thus form an upwardly and outwardly inclined conical or annular baffle or circular wall which, for convenience and economy in construction, and in order to obtain the advantages of simplicity and strength of construction, is made in one integral piece with the bowl bottom or base 4, rather than in the form of a separate ring or annular baffle. The wall 39, rim 38 and outer downwardly and outwardly inclined wall or conical surface 40 of the baffle plate or upwardly projecting inner annular converging concave and convex surfaces or wall portions 39, 40 formed by the base, thus extend between the cream in the chamber 34 inside of the rim 38, and the separated relatively heavy liquid or milk located outside of the annular rim 38 of said chamber 34, and tend to prevent the separated milk outside of the rim 38 from entering the cream chamber 34. The whole milk introduced into the rapidly rotating bowl through the inlet passages 14, and 13 is caused to flow outward between the separator disks 16 and in contact with the lower or concave surfaces or sides of said disks to the periphery of the separator chamber and bowl; and the relatively light butter fat or cream is caused to flow inward toward the axial center of the separator chamber and bowl and in contact with the upwardly and inwardly inclined convex conical sides or upper surfaces of the disks 16, and the convex conical wall 40 formed by the base. The incoming milk or relatively heavy liquid is thus permitted to pass over and across the rim 38 of the bottom cream chamber 34 and against the bottom concave face of the lowermost conical separator disk 16 and toward or in the direction of the periphery of the separator chamber and bowl, but in thus following the course of least resistance in the direction of the periphery of the bowl, the incoming milk will pass over the rim 38 and cream chamber 34 without flowing into said annular bottom cream chamber, and without disturbing or becoming intermixed with the cream in said annular cream chamber from the lower or bottom peripheral portion of which the cream is discharged through the cream outlet controlled by the cream screw 36 which is adapted to be adjusted inward or outward to control the degree of richness of the cream in the usual or ordinary manner.

The cream outlet discharges into a cream cover or receptacle 41, which may be of any ordinary and well known or desired form.

The bowl is removably mounted upon and in fixed relation to an upright rotary spindle 42, the upper portion of which extends into an axial opening 43 in the hollow shaft 5, and in concentric relation to the bowl shell, said opening 43 being below and separated from the milk-inlet opening 14 in the upper end of the hollow shaft.

The spindle 42 is rotatively mounted and journaled in suitable bearings including a bottom bearing—not shown—which may be of any ordinary or suitable form, and a yielding neck bearing comprising a sleeve or transversely movable shaft-encircling bearing member 44 mounted in movable relation to and encircled by a stationary bearing member 45, and having a helical spring 46 connected at one end with the sleeve 44 and at the other end with the bearing member 45, and supported by the latter so as to permit and yieldingly resist the lateral or transverse movement of the sleeve 44 and spindle 42 during the rapid rotation of the latter with the bowl supported thereby and rotative therewith. The spindle has a worm 47 thereon or formed in one integral piece therewith, and is driven or rotated by means of a worm wheel 48 in operative engagement with said worm and driven by a shaft 49 journaled in suitable bearings in the machine frame 50, and operatively connected with suitable driving means which may be of any ordinary and well known or desired type, such as a crank adapted to be manually operated, or gear mechanism or other connecting means adapted to be connected with and driven by a motor or other source of power.

I claim:

1. In a cream separator, the combination of a rotary bowl shell forming a separator chamber provided with inlet and outlet openings including a cream outlet, a series of superposed annular truncated-cone-shaped separator disks located inside of the separator chamber and provided with spaces between said disks, and an inner annular baffle wall encircling the axis of the bowl shell and located between said axis and the outer peripheral wall of the separator chamber and bowl shell and forming a cream chamber within and encircled by said annular inner baffle wall and with which said cream outlet communicates.

2. In a cream separator, the combination of a rotary bowl shell forming a separator chamber provided with inlet and outlet openings including a cream outlet, said bowl shell having opposite end walls and an outer peripheral wall, a series of superposed annular truncated-cone-shaped separator disks located inside of the separator chamber and provided with spaces between said disks, and an inner annular baffle projecting inward on the inner side of one of said end walls of the bowl shell and forming a cream-chamber within said baffle and encircling the axis of the bowl at one end thereof and with which cream-chamber said cream outlet communicates.

3. In a cream separator, the combination of a rotary bowl shell forming a separator chamber provided with inlet and outlet openings including a cream outlet located at one end of said bowl shell, said bowl shell having opposite end walls and an outer peripheral wall, a series of superposed annular separator disks located inside of the separator chamber and provided with spaces between said disks, and an inner annular baffle wall encircling the axis of the bowl shell and extending inward from an end wall and between said cream outlet and the peripheral outer wall of the bowl shell and forming a cream-chamber within said baffle and with which said cream outlet communicates.

4. In a cream separator, the combination of a rotary bowl shell forming a separator chamber provided with inlet and outlet openings including a cream outlet, and having opposite end walls and an outer peripheral wall, a series of superposed annular separator disks located inside of the separator chamber and encircling the axis of the bowl shell, and an inner annular baffle on one of the end walls of the bowl shell and extending inward between said cream outlet and the outer peripheral wall of the separator chamber and bowl shell and forming a cream chamber which communicates with the disk-containing portion of the separator chamber and with said cream outlet.

5. In a cream separator, the combination of a rotary bowl shell forming a separator chamber provided with inlet and outlet openings including a cream outlet, a hollow shaft inside of and in concentric relation to the axis of the bowl shell, a series of superposed annular separator disks located inside of the separator chamber and encircling the hollow shaft and axis of the bowl shell, and having spaces between said disks, and an inner annular baffle encircling the hollow shaft and extending inward between the hollow shaft and the peripheral wall of the bowl shell, and forming an annular cream chamber between said baffle and hollow shaft, said cream chamber being adapted to communicate with the disk-containing portion of the separator chamber and with said cream outlet.

6. In a cream separator, the combination of a rotary bowl shell forming a separator chamber provided with outlet openings including a milk outlet and a cream outlet, and having opposite end walls and an outer peripheral wall, a hollow shaft in concentric relation to the axis of the bowl shell and provided with inlet openings communicating with the interior of the separator chamber, a series of superposed annular truncated-cone-shaped separator disks located inside of the separator chamber and encircling the hollow shaft and the axis of the bowl shell, and having spaces between said disks, and an inwardly projecting annular baffle wall portion on one of the end walls of said bowl shell and encircling said hollow shaft and forming an annular cream chamber encircling the hollow shaft and communicating with the disk-containing portion of the separator chamber and with said cream outlet.

7. In a cream separator, the combination of a rotary bowl shell forming a separator chamber provided with outlet openings including a milk outlet and a cream outlet, and having top and bottom end walls and an outer peripheral wall, a hollow shaft in concentric relation to the axis of the bowl shell and having its opposite ends connected with the top and bottom end walls of the bowl shell, said hollow shaft having liquid-inlet openings communicating with the interior of the separator chamber, a series of superposed annular truncated-cone-shaped separator disks encircling the hollow shaft on the inside of the separator chamber, and provided with spaces between said disks, and an annular inner baffle wall portion on the bottom end wall of the bowl shell and encircling the hollow shaft and forming a cream chamber between said baffle wall and the hollow shaft, the top of said baffle wall and of the cream-chamber formed within the baffle wall being below the level of the inlet openings in the hollow shaft, said cream chamber communicating with the disk-containing portion of the separator chamber and with said cream outlet.

8. In a cream separator, the combination of a rotary bowl shell forming a separator chamber provided with outlet openings including a milk outlet and a cream outlet, and having top and bottom end walls and an outer peripheral wall, a hollow shaft in concentric relation to the axis of the bowl shell and having its opposite ends connected with the top and bottom end walls of the bowl shell, said hollow shaft having liquid inlet openings communicating with the interior of the separator chamber, and a series of superposed annular truncated-cone-shaped separator disks encircling the hollow shaft on the inside of the separator chamber and provided with spaces between said disks, said bottom wall having an inner upwardly and outwardly inclined conical annular wall portion encircling the hollow shaft and forming the walls of an annular conical cream chamber which encircles the lower portion of the hollow shaft below the inlet openings in said hollow shaft and communicates with the disk-containing portion of the separator chamber and with said cream outlet.

9. In a cream separator, the combination of a rotary bowl shell forming a separator chamber provided with liquid inlet and outlet openings including a cream outlet, and having a top and bottom wall and an outer peripheral wall, a hollow shaft inside of and in concentric relation to the axis of the bowl shell, a plurality of radial accelerator blades extending longitudinally of the hollow shaft and projecting outward radially from the periphery of the same, a series of truncated-cone-shaped separator disks encircling the hollow shaft and said blades and provided with spaces between said disks, the peripheral marginal portions of said separator disks being in supporting engagement and movable transversely with respect to each other to balanced position with the outer peripheral edges of all of said disks out of contact with and spaced apart from the peripheral wall of the separator chamber and with the inner perimeters of said disks adapted to engage the periphery of said hollow shaft, said hollow shaft acting to permit and limit the movement of each disk to said balanced position, and an inwardly projecting annular baffle wall portion on the inner side of one of the end walls of said bowl shell and encircling and forming an annular cream chamber in one end of the bowl shell and communicating with the disk-containing portion of the separator chamber and with said cream outlet, said cream chamber baffle wall being located between said cream outlet and the periphery of the separator chamber and bowl shell.

Signed at Port Huron, in the county of St. Clair and State of Michigan this 19th day of September, 1921.

OTTO KRENKE.

Witnesses:
GERTRUDE ENGLER,
DORIS DEAL.